(12) United States Patent
Norman et al.

(10) Patent No.: US 7,688,883 B1
(45) Date of Patent: Mar. 30, 2010

(54) RECEIVED SIGNAL CORRELATION USING A CORRELATION SCALING FACTOR

(75) Inventors: Charles Norman, Huntington Beach, CA (US); Shawn Weisenburger, Calgary (CA)

(73) Assignee: RF Micro Devices, Inc., Greensboro, NC (US)

( * ) Notice: Subject to any disclaimer, the term of this patent is extended or adjusted under 35 U.S.C. 154(b) by 655 days.

(21) Appl. No.: 11/669,798

(22) Filed: Jan. 31, 2007

(51) Int. Cl.
*H04B 1/00* (2006.01)
(52) U.S. Cl. ...................................... 375/149
(58) Field of Classification Search ............... 375/149
See application file for complete search history.

(56) References Cited

U.S. PATENT DOCUMENTS 6,795,452 B2 * 9/2004 Iancu ......................... 370/515

7,583,771 B2 * 9/2009 Zweigle et al. ............. 375/355

* cited by examiner

*Primary Examiner*—David C Payne
*Assistant Examiner*—Nader Bolourchi
(74) *Attorney, Agent, or Firm*—Withrow & Terranova, P.L.L.C.

(57) ABSTRACT

The present invention is a method and apparatus for generating a scaled correlation that is based on an estimate of the arrival time of a synchronization point in a received RF signal relative to a sampling clock, which is used to sample the received RF signal after down conversion. The scaled correlation may be used to validate the estimate of the arrival time of the synchronization point and, in certain embodiments of the present invention, may be used to update the estimate of the arrival times for subsequent synchronization points. Using the scaled correlation may provide arrival time estimates with a finer resolution and accuracy than the period of the sampling clock. Such arrival time estimates are important for timing-based applications, such as GPS receivers or navigation receivers.

20 Claims, 10 Drawing Sheets

RECEIVED SIGNAL CORRELATION USING A CORRELATION SCALING FACTOR

FIELD OF THE INVENTION

The present invention relates to correlators used in radio frequency (RF) receivers.

BACKGROUND OF THE INVENTION

RF receivers often use correlators to correlate a code in a received signal with a reference code. Once the received code is correlated with the reference code, other information in the received signal can be extracted. The other information may be used in applications associated with equipment containing the RF receiver. Certain applications rely on the arrival time of the received signal at the RF receiver. Such applications include a Global Positioning System (GPS) receiver, a navigation system receiver, or the like. Such systems determine distances to the RF receiver from a transmitter based on the precise arrival time of the received signal at the RF receiver. Specifically, during correlation, the arrival time of a synchronization point in the received signal is identified. The applications use the arrival time to determine distances and other arrival time dependent elements.

The accuracy of the identification of the arrival time of the synchronization point is based on the time precision of the correlation. Generally, a received signal is sampled using a sampling clock to create a sampled signal. The sampling rate is normally higher than the data bit rate in the sampled signal. The correlator works by comparing different groups of sampled bits with the reference code. The sampled signal is correlated when a group of sampled bits matches the reference code. Each group of sampled bits differs from the other groups by at least one sampled bit, therefore, the maximum time precision of the correlation is plus or minus one sample time. Typically, the sampling clock is asynchronous with the data bits in the received signal; therefore, the arrival time of the synchronization point as determined from the sampled signal may differ from the actual arrival time of the synchronization point in the received signal by plus or minus one sample time, which may result in an arrival time error. Applications requiring arrival time accuracy must tolerate an error of plus or minus one sample time. Increasing the sampling rate can reduce the arrival time error; however, an increased sampling rate may increase circuit complexity, cost, and power consumption. Additionally, some applications include RF signals having a plurality of synchronization points, and if transitions in the received signal are close to transitions of the sampling clock, then timing oscillations or discontinuities between samples associated with the synchronization points can occur. Such oscillations or discontinuities may be problematic for some applications. Some correlators address this problem by introducing a deliberate frequency offset between the sampling clock and the data rate of the received signal such that transitions in the received signal are always moving relative to transitions of the sampling clock. However, such correlators must correlate and extract data in the presence of the frequency offset, which may increase complexity, cost, and increase power consumption. Other correlators may correlate using two different reference code timings, which requires some knowledge of the timing of a synchronization point. The circuitry necessary to process all of the signals may increase complexity, power consumption, and reduce effective signal levels. Thus, there is a need for a correlation process that provides correlations having arrival time errors less than the sampling time; minimizes the effects of oscillations associated with sampling; is relatively simple and cost effective to implement; and is low powered.

SUMMARY OF THE INVENTION

The present invention is a method and apparatus for generating a scaled correlation that is based on an estimate of the arrival time of a synchronization point in a received RF signal relative to a sampling clock, which is used to sample the received RE signal after down conversion. The scaled correlation may be used to validate the estimate of the arrival time of the synchronization point and, in certain embodiments of the present invention, may be used to update the estimate of the arrival times for subsequent synchronization points. Using the scaled correlation may provide arrival time estimates with a finer resolution and accuracy than the period of the sampling clock. Such arrival time estimates are important for timing-based applications, such as GPS receivers or navigation receivers. Additionally, higher resolution time estimates may enable receivers to optimize sampling methods to maximize signal integrity. Scaled correlators may be relatively simple, cost effective, and low powered.

In certain embodiments of the present invention, the scaled correlation is generated by correlating the sampled down converted signal with a reference code, and multiplying the correlation with a scaling factor. The scaling factor is inversely related to the difference between the arrival time estimate and an edge of the sampling clock. The sampling clock is synchronized with a reference code clock used during correlation. Some embodiments of the present invention may involve receiving an RF signal having multiple synchronization points. Scaled correlations may be used to identify and compensate timing oscillations and discontinuities between samples associated with the synchronization points when the transitions in the received signal are close to transitions of the sampling clock.

Correlations may be performed on data combined from multiple synchronization points. Scaled correlations may be performed on data from multiple correlations. One or more correlations may be performed with the reference code advanced or delayed by one or more cycles of the sampling clock with respect to the sampled down converted signal. Any of the above correlations may be used individually or combined to update estimates of the arrival times for subsequent synchronization points. Some combinations of correlations may reduce the influence of multipath signals. Multiple correlations may be averaged; however, since the time difference between the estimated arrival time of the synchronization point and the sampling clock edge is known, two or more correlations may be combined instead of averaged to improve effective signal strength.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

Figure 1:
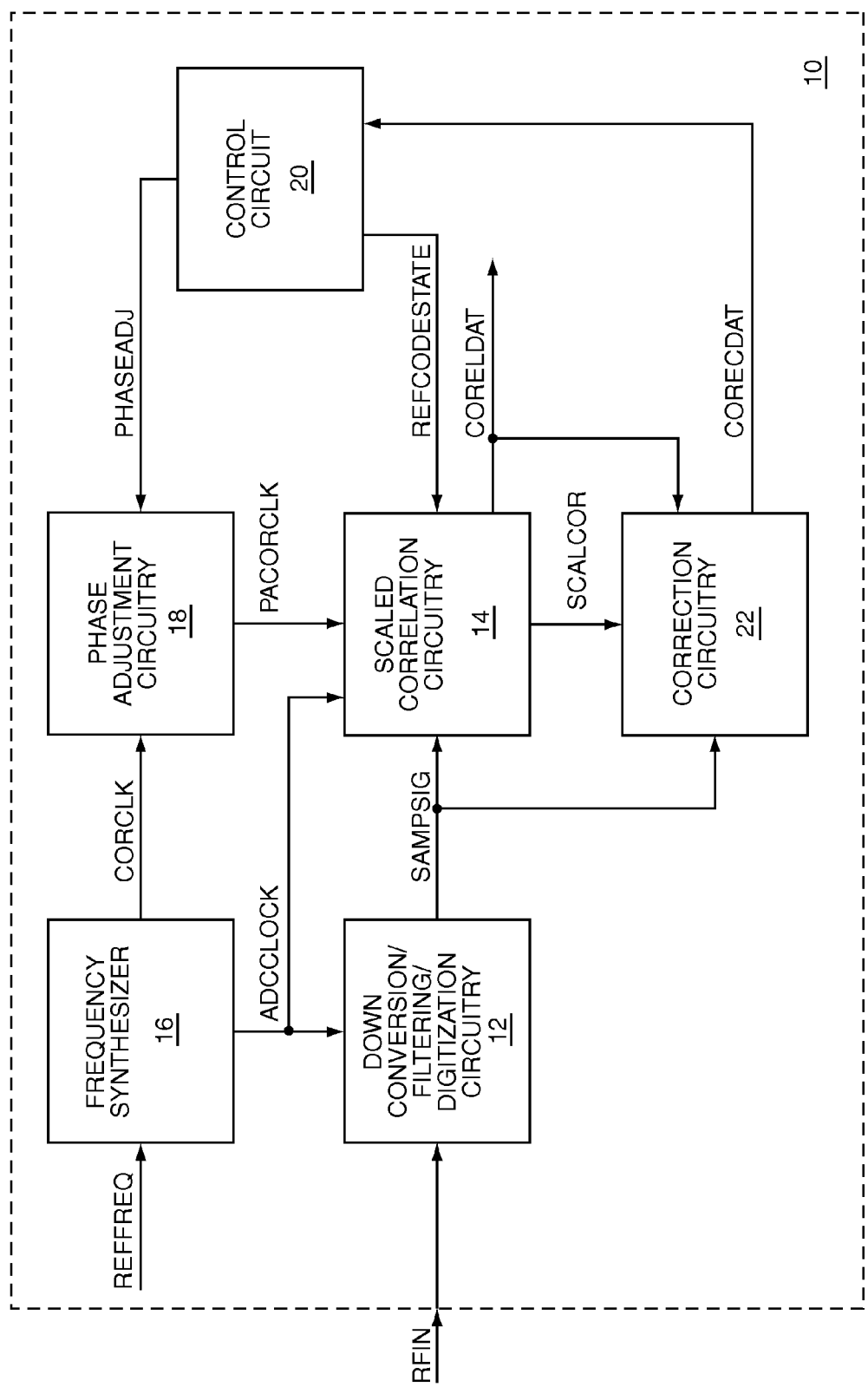
FIG. 1 illustrates one embodiment of the present invention in an RF receiver having scaled correlation.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is a method and apparatus for generating a scaled correlation that is based on an estimate of the arrival time of a synchronization point in a received RF signal relative to a sampling clock, which is used to sample the received RF signal after down conversion. The scaled correlation may be used to validate the estimate of the arrival time of the synchronization point and, in certain embodiments of the present invention, may be used to update the estimate of the arrival times for subsequent synchronization points. Using the scaled correlation may provide arrival time estimates with a finer resolution and accuracy than the period of the sampling clock. Such arrival time estimates are important for timing-based applications, such as GPS receivers or navigation receivers. Additionally, higher resolution time estimates may enable receivers to optimize sampling methods to maximize signal integrity. Scaled correlators may be relatively simple, cost effective, and low powered.

In certain embodiments of the present invention, the scaled correlation is generated by correlating the sampled down converted signal with a reference code, and multiplying the correlation with a scaling factor. The scaling factor is inversely related to the difference between the arrival time estimate and an edge of the sampling clock. The sampling clock is synchronized with a reference code clock used during correlation. Some embodiments of the present invention may involve receiving an RF signal having multiple synchronization points. Scaled correlations may be used to identify and compensate timing oscillations and discontinuities between samples associated with the synchronization points when the transitions in the received signal are close to transitions of the sampling clock. A synchronization point may be coincident with the beginning of a code in the sampled down converted signal used for correlating the sampled down converted signal with a reference code. The RF signal having multiple synchronization points may include one or more interruptions.

Correlations may be performed on data combined from multiple synchronization points. Scaled correlations may be performed on data from multiple correlations. Scaled correlations may be created using multiple scaling factors. One or more correlations may be performed with the reference code advanced or delayed by one or more cycles of the sampling clock with respect to the sampled down converted signal. Any of the above correlations may be used individually or combined to update estimates of the arrival times for subsequent synchronization points. Some combinations of correlations may reduce the influence of multipath signals. Multiple correlations may be averaged; however, since the time difference between the estimated arrival time of the synchronization point and the sampling clock edge is known, two or more correlations may be combined instead of averaged to improve effective signal strength.

One embodiment of the present invention is used in a GPS receiver, which receives signals from GPS satellites orbiting the earth. A GPS system relies on accurate timing of signals from a GPS satellite to the GPS receiver so that distances can be accurately determined. The GPS satellite may be in orbit moving toward the GPS receiver, moving away from the GPS receiver, or passing overhead the GPS receiver. Signals from the GPS satellite moving toward the GPS receiver will have a positive Doppler frequency shift in the received signal. Likewise, signals from the GPS satellite moving away from the GPS receiver will have a negative Doppler frequency shift in the received signal. Circuitry in the GPS receiver may compensate for some of the Doppler shift with mixing; however, there will usually be a small difference between the frequency of a nominal received signal and the compensated Doppler shifted received signal; therefore, the arrival time of synchronization points in the received GPS signal relative to the sampling clock will slowly change. Signals from the GPS satellite passing overhead may not have a significant Doppler frequency shift; therefore, the arrival time of synchronization points in the received GPS signal relative to the sampling clock may not change, and if transitions in the received signal are close to transitions of the sampling clock, then timing oscillations or discontinuities between samples associated with the synchronization points can occur. In the present invention, scaled correlations may be used to compensate or eliminate the timing oscillations or discontinuities.

As long as the change of the arrival time of synchronization points in a received signal relative to the sampling clock is a small fraction of the sampling clock period between received consecutive synchronization points, scaled correlations may be very effective. FIG. 1 illustrates one embodiment of the present invention in an RF receiver 10 having scaled correlation. Down conversion, filtering, and digitization circuitry 12 receives an RF signal RFIN, which is down converted and filtered into a down converted received signal DCRS (not shown). The down converted received signal DCRS is digitized using digitization circuitry to create a sampled signal SAMPSIG, which feeds scaled correlation circuitry 14. The sampling rate of the sampled signal SAMPSIG is determined by a sampling clock ADCCLOCK, which is provided from a frequency synthesizer 16 that also provides a correlation clock CORCLK for correlation. The correlation clock CORCLK is synchronous with the sampling clock ADCCLOCK, and both clocks CORCLK, ADCCLOCK are synthesized from a reference clock REFFREQ. In an alternate embodiment of the present invention, the correlation clock CORCLK is nearly synchronous with the sampling clock ADCCLOCK such that any phase-shift change between the clocks CORCLK, ADCCLOCK is small during the time between synchronization points.

In the present invention, scaled correlation is based on approximately the time difference between an estimate of the arrival time of a synchronization point in the down converted received signal DCRS and an edge of the sampling clock ADCCLOCK; therefore, during correlation the correlation clock CORCLK is phase-shifted from the sampling clock ADCCLOCK by approximately the time difference between an estimate of the arrival time of a synchronization point in the down converted received signal DCRS and an edge of the sampling clock ADCCLOCK. Phase adjustment circuitry 18 receives and phase-shifts the correlation clock CORCLK to create a phase-shifted correlation clock PACORCLK, which is provided to the scaled correlation circuitry 14. Arrival time estimates are generated by control circuitry 20, which provides phase-shift information PHASEADJ to the phase adjustment circuitry 18. The control circuitry 20 determines the clock cycle of the phase-shifted correlation clock PACORCLK to start correlating a reference code with the sampled signal SAMPSIG. A reference code start cycle REFCODESTATE is provided to the scaled correlation circuitry 14.

The scaled correlation circuitry 14 correlates the sampled signal SAMPSIG with the reference code to generate a correlation, and then generates a scaled correlation SCALCOR based on the correlation and the phase-shift between the sampling clock ADCCLOCK and the phase-shifted correlation clock PACORCLK. In one embodiment of the present invention, the phase-shift between the sampling clock ADCCLOCK and the phase-shifted correlation clock PACORCLK may be zero. The scaled correlation circuitry 14 provides correlated data CORELDAT to downstream receiver circuitry (not shown) and to correction circuitry 22, which uses the sampled signal SAMPSIG, the scaled correlation SCALCOR, correlated data CORELDAT, or any combination thereof to generate correction data CORECDAT that is provided to the control circuitry 20 for updating the arrival time estimate of the synchronization point in the down converted received signal DCRS. The correction circuitry 22 may re-correlate the sampled signal SAMPSIG with the reference code by shifting the reference code early, late, or both with respect to the sampled signal SAMPSIG. Some combinations of early and late correlations may reduce the influence of multipath signals. In general, weighing correlations more heavily on early data, before some multipath signals arrive, may be effective in reducing the influence of multipath signals. In a first exemplary embodiment of the present invention, correction data CORECDAT is based on three times an early scaled correlation minus a late scaled correlation. In a second exemplary embodiment of the present invention, correction data is based on a first scaled correlation difference minus a second scaled correlation difference such that the first scaled correlation difference is approximately equal to a first early correlation minus a first late correlation, and the second scaled correlation difference is approximately equal to a second early correlation minus a second late correlation.

In the RF receiver 10 illustrated in FIG. 1, the correlation clock CORCLK is phase-shifted from the sampling clock ADCCLOCK by approximately the time difference between an estimate of the arrival time of a synchronization point in the down converted received signal DCRS and an edge of the sampling clock ADCCLOCK. In one embodiment of the present invention, the phase-shift is based on the time difference between an estimate of the arrival time of a synchronization point in the down converted received signal DCRS and the nearest edge of the sampling clock ADCCLOCK. In an alternate embodiment of the present invention, the sampling clock ADCCLOCK is phase-shifted from the correlation clock CORCLK by approximately the time difference between an estimate of the arrival time of a synchronization point in the down converted received signal DCRS and an edge of the sampling clock ADCCLOCK. All or part of the phase adjustment circuitry 18, the scaled correlation circuitry 14, the control circuitry 20, and the correction circuitry 22 may be implemented in hardware, micro-code, firmware, software, or any combination thereof. Performance requirements may require high performance computing hardware to execute the micro-code, firmware, software, or any combination thereof. The high performance computing hardware may include digital signal processors (DSPs), embedded processors, ASIC hardware, FPGA hardware, or the like.

Figure 2:
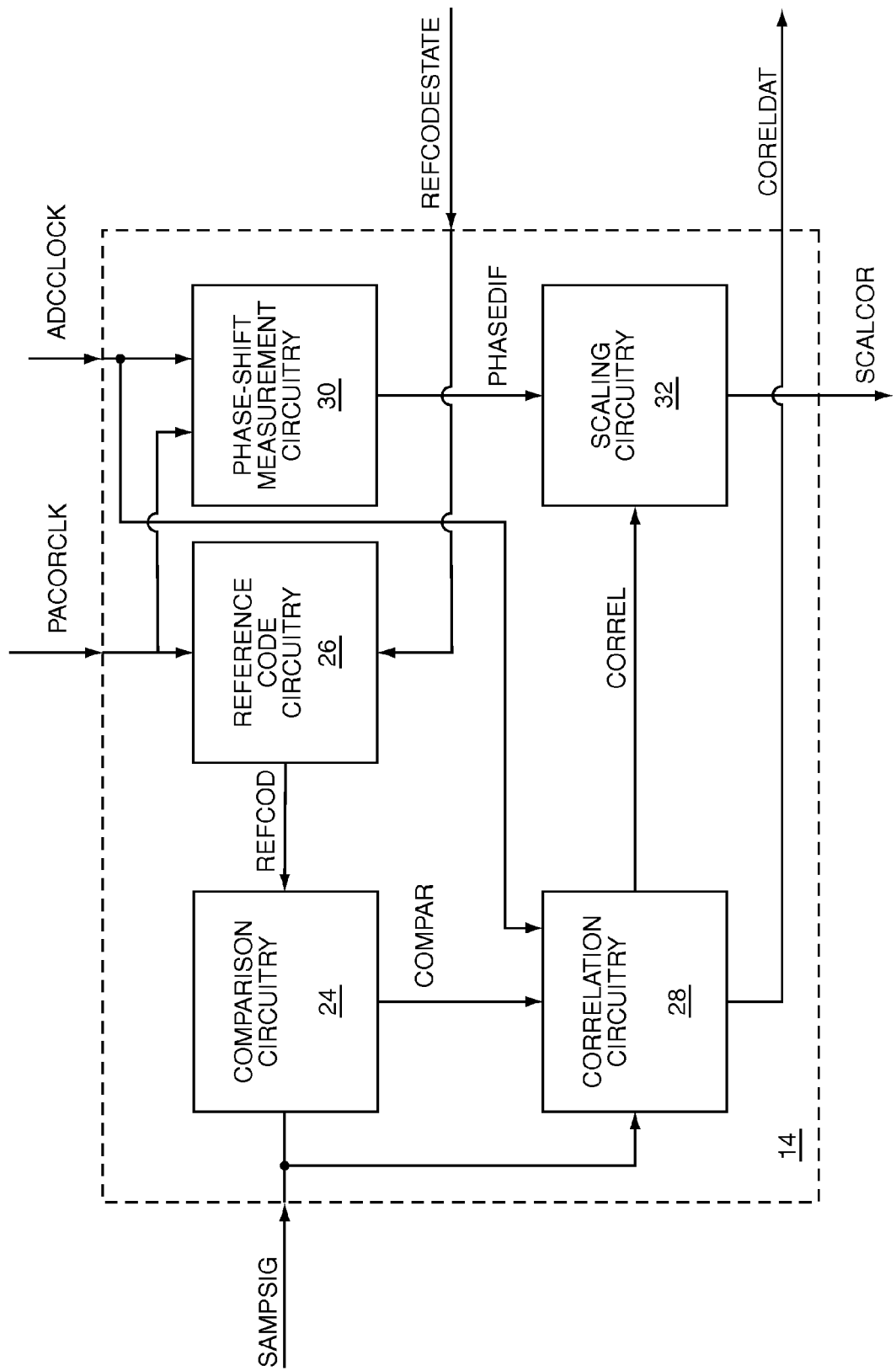
FIG. 2 shows details of the scaled correlation circuitry illustrated in FIG. 1.

FIG. 2 shows details of the scaled correlation circuitry 14 illustrated in FIG. 1. The scaled correlation circuitry 14 correlates a reference code REFCOD with an identical code embedded in the sampled signal SAMPSIG. Comparison circuitry 24 compares the sampled signal SAMPSIG with the reference code REFCOD to generate a compare result COMPAR. The sampled signal SAMPSIG is clocked into the comparison circuitry 24 using the sampling clock ADCCLOCK, and the reference code REFCOD is clocked into the comparison circuitry 24 using the phase-shifted correlation clock PACORCLK, which could also be referred to as a reference code clock. Reference code circuitry 26 provides the reference code REFCOD at the appropriate time based on the reference code start cycle REFCODESTATE. Using the compare result COMPAR, correlation circuitry 28 integrates the matches between the reference code REFCOD and the code embedded in the sampled signal SAMPSIG to create a correlation CORREL. The correlation circuitry 28 creates the correlated data CORELDAT from the sampled signal SAMPSIG and the correlation CORREL. Phase-shift measurement circuitry 30 measures the phase-shift between the phase-shifted correlation clock PACORCLK and the sampling clock ADCCLOCK to provide phase-shift data PHASEDAT to scaling circuitry 32, which generates a correlation scaling factor based on the phase-shift data PHASEDAT. The correlation scaling factor is multiplied by the correlation CORREL to create the scaled correlation SCALCOR. Since the correlation process is linear, in an alternate embodiment of the present invention, instead of applying the correlation scaling factor to the correlation CORREL, the reference code REFCOD, the sampled signal SAMPSIG, or both may be scaled to provide a scaled correlation. In an exemplary embodiment of the present invention, the comparison circuitry 24 uses "exclusive or" circuitry to compare the reference code REFCOD with the sampled signal SAMPSIG. "Exclusive or" circuitry provides an active output signal when two input signals match, and an inactive output signal when the two input signals are different.

Figure 3:
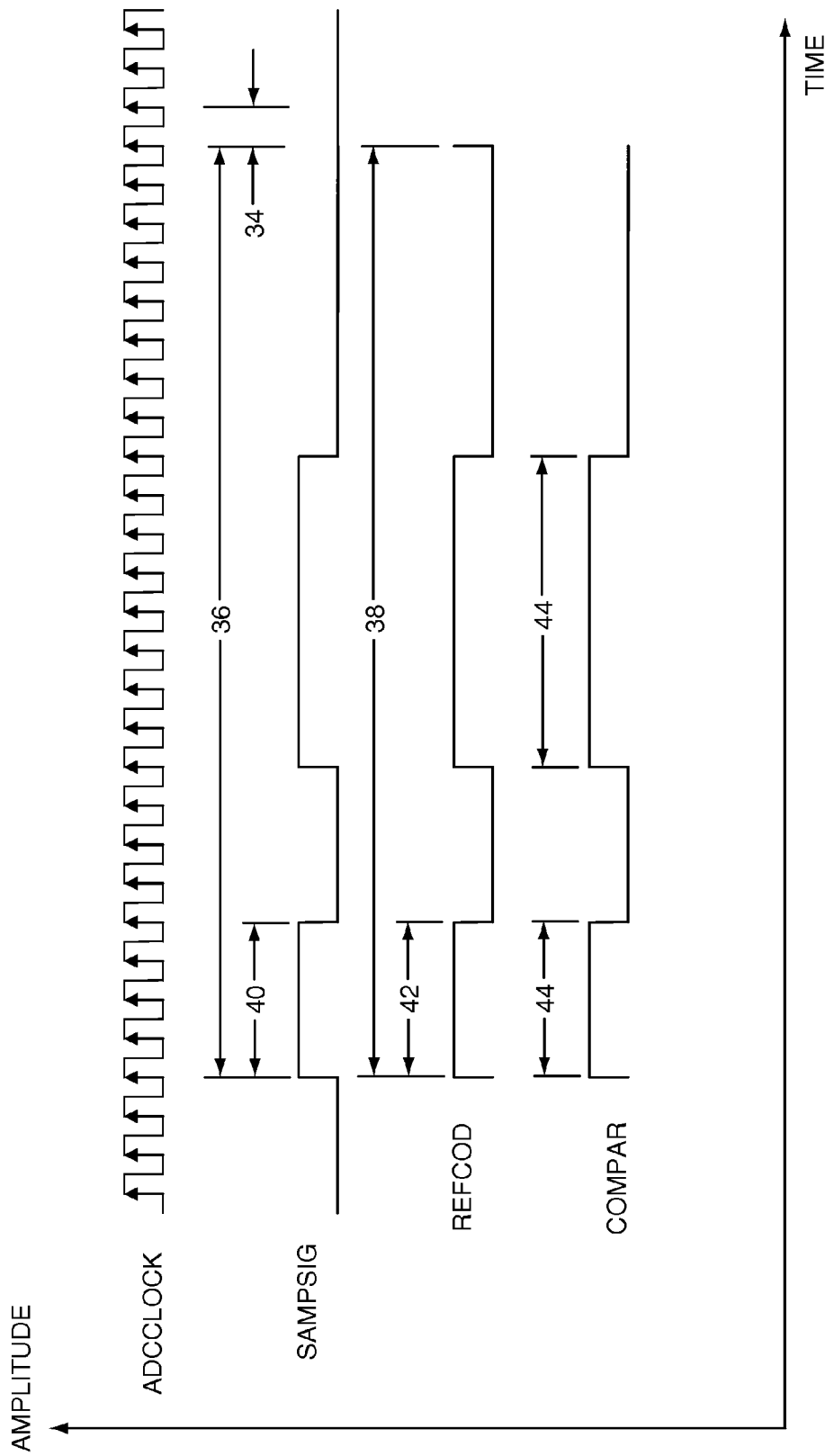
FIG. 3 is a graph illustrating perfect correlation between a sampled signal and a reference code.

FIG. 3 is a graph illustrating perfect correlation between the sampled signal SAMPSIG and the reference code REF- COD, which are perfectly aligned with each other and the sampling clock ADCCLOCK. The sampling clock ADCCLOCK has a sampling clock period 34. Each data bit of either the sampled signal SAMPSIG or the reference code REFCOD is based on four cycles of the sampling clock ADCCLOCK. A code 36 embedded in the sampled signal SAMPSIG and a reference code REFCOD 38 each include six data bits. When the start of a first code bit 40 embedded in the sampled signal SAMPSIG is aligned with the start of a first reference code bit 42, and the frequency of the sampling clock ADCCLOCK is equal to the frequency of the reference code clock (not shown), the correlation is perfect. When the sampled signal SAMPSIG is compared with the reference code REFCOD, the compare result COMPAR matches the codes 36, 38. A high state 44 of the compare result COMPAR is then integrated to create the correlation CORREL. Alternate embodiments of the present invention may use a different number of cycles of the sampling clock ADCCLOCK for each data bit. A different number of data bits may be used for the reference code REFCOD 38.

Figure 4:
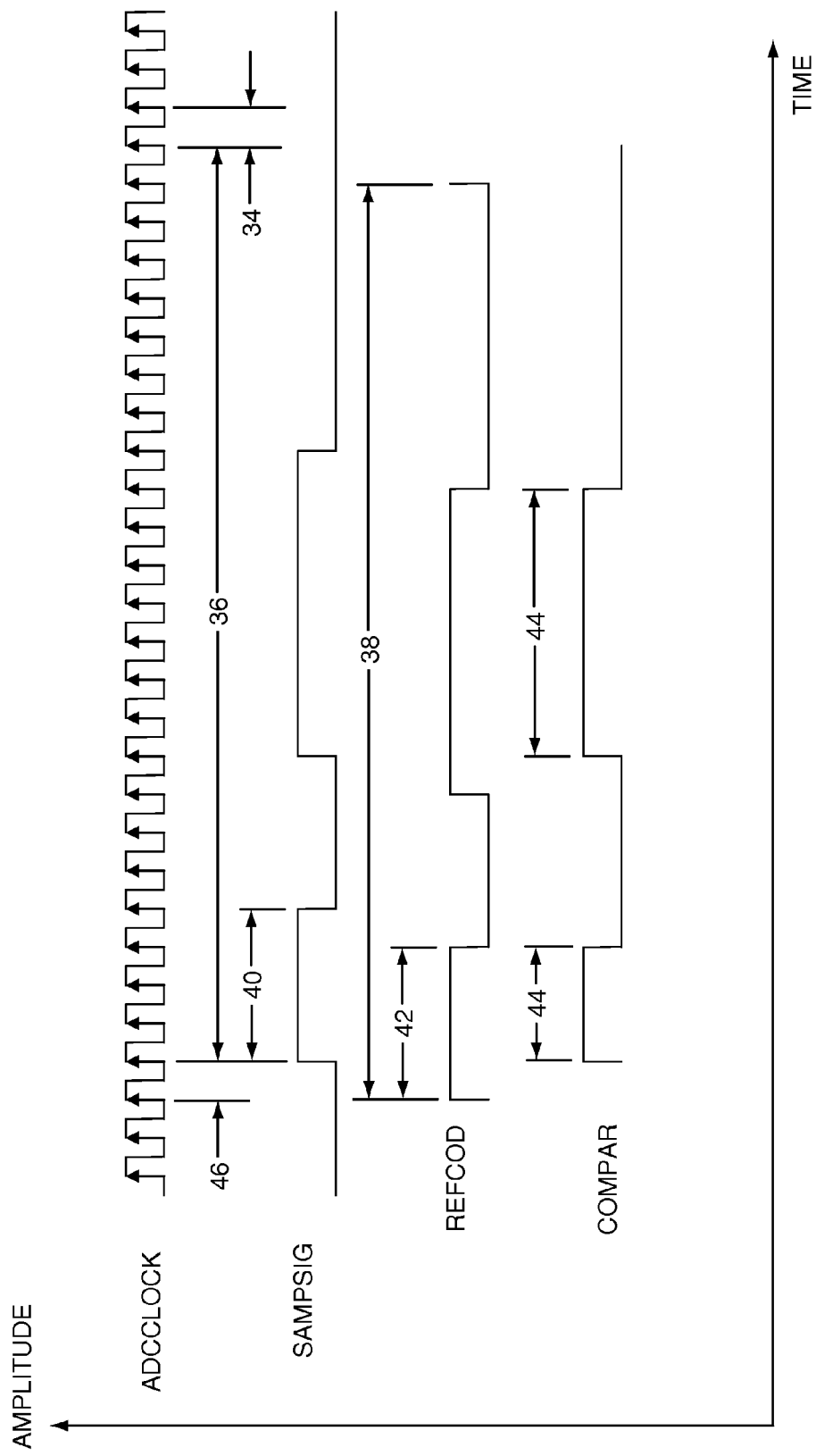
FIG. 4 is a graph illustrating correlation between the sampled signal and the reference code when the reference code leads the sampled signal by one cycle of the sampling clock.

FIG. 4 is a graph illustrating correlation between the sampled signal SAMPSIG and the reference code REFCOD 38 when the reference code REFCOD 38 leads the sampled signal SAMPSIG by one cycle 46 of the sampling clock ADCCLOCK. The high state 44 of the compare result COMPAR is two cycles of the sampling clock ADCCLOCK less than the perfect correlation illustrated in FIG. 3.

Figure 5:
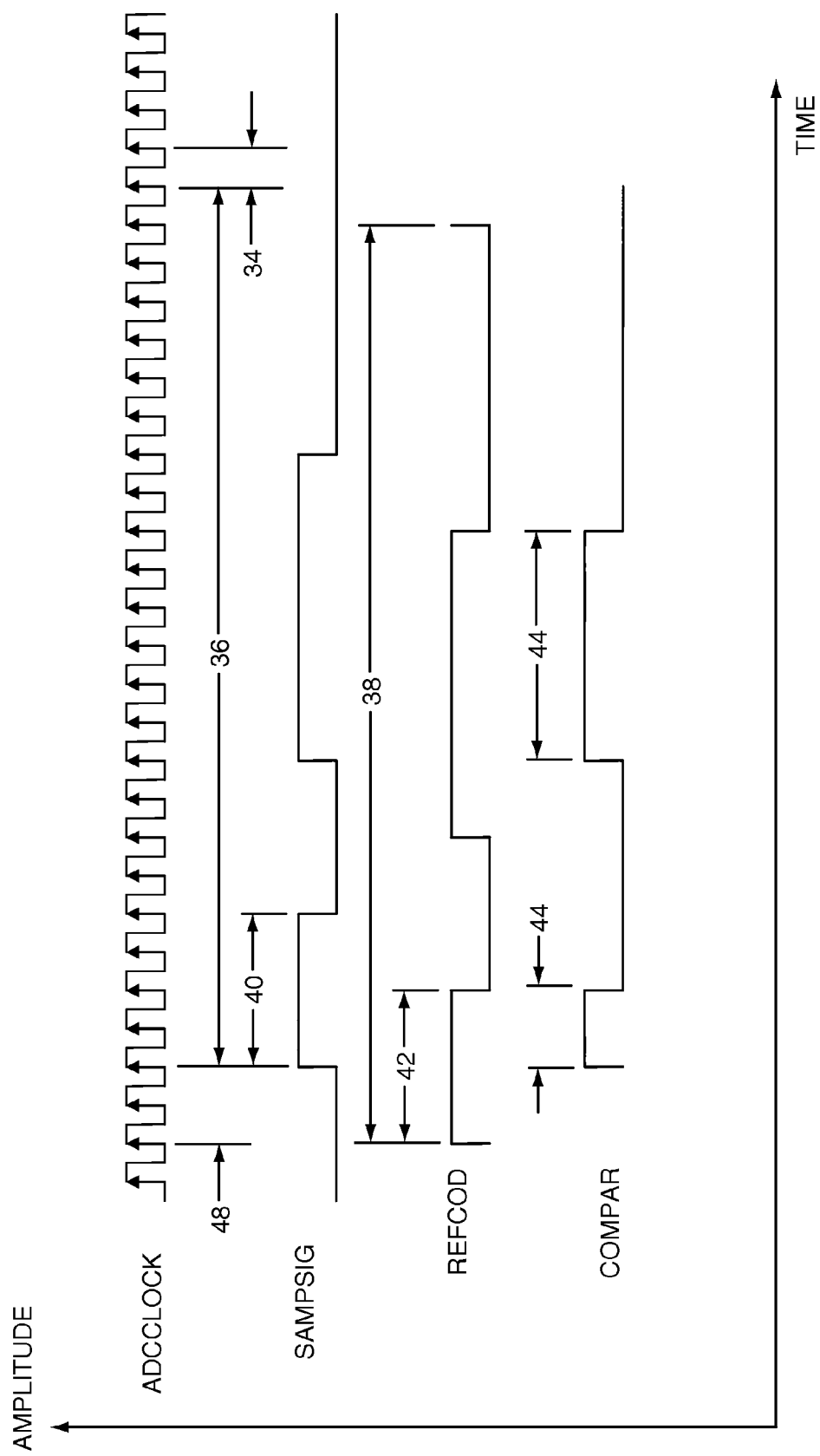
FIG. 5 is a graph illustrating correlation between the sampled signal and the reference code when the reference code leads the sampled signal by two cycles of the sampling clock.

FIG. 5 is a graph illustrating correlation between the sampled signal SAMPSIG and the reference code REFCOD 38 when the reference code REFCOD 38 leads the sampled signal SAMPSIG by two cycles 48 of the sampling clock ADCCLOCK. The high state 44 of the compare result COMPAR is four cycles of the sampling clock ADCCLOCK less than the perfect correlation illustrated in FIG. 3.

Figure 6:
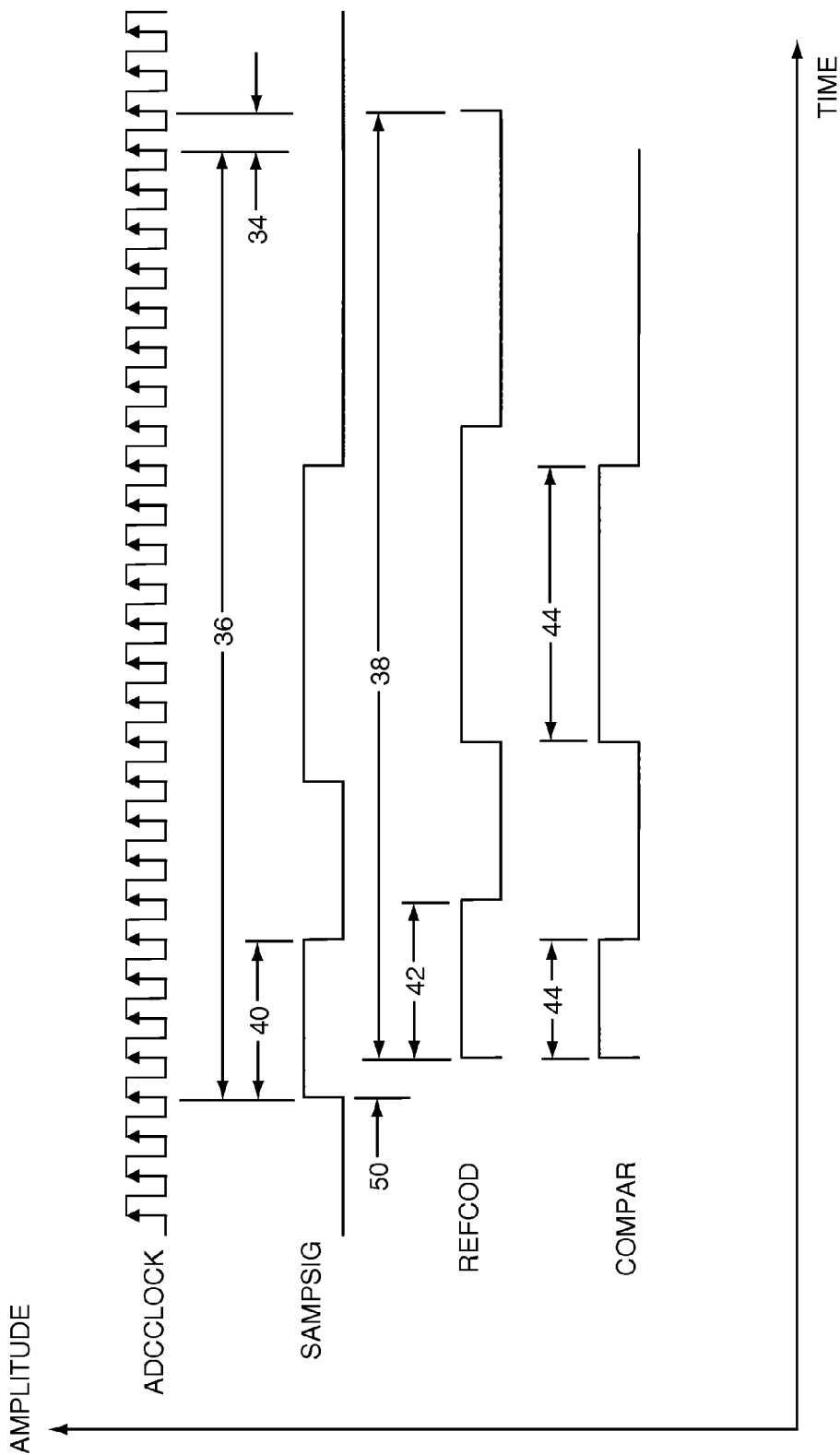
FIG. 6 is a graph illustrating correlation between the sampled signal and the reference code when the reference code lags the sampled signal by one cycle of the sampling clock.

FIG. 6 is a graph illustrating correlation between the sampled signal SAMPSIG and the reference code REFCOD 38 when the reference code REFCOD 38 lags the sampled signal SAMPSIG by one cycle 50 of the sampling clock ADCCLOCK. The high state 44 of the compare result COMPAR is two cycles of the sampling clock ADCCLOCK less than the perfect correlation illustrated in FIG. 3 and is equal to the correlation illustrated in FIG. 4.

Figure 7:
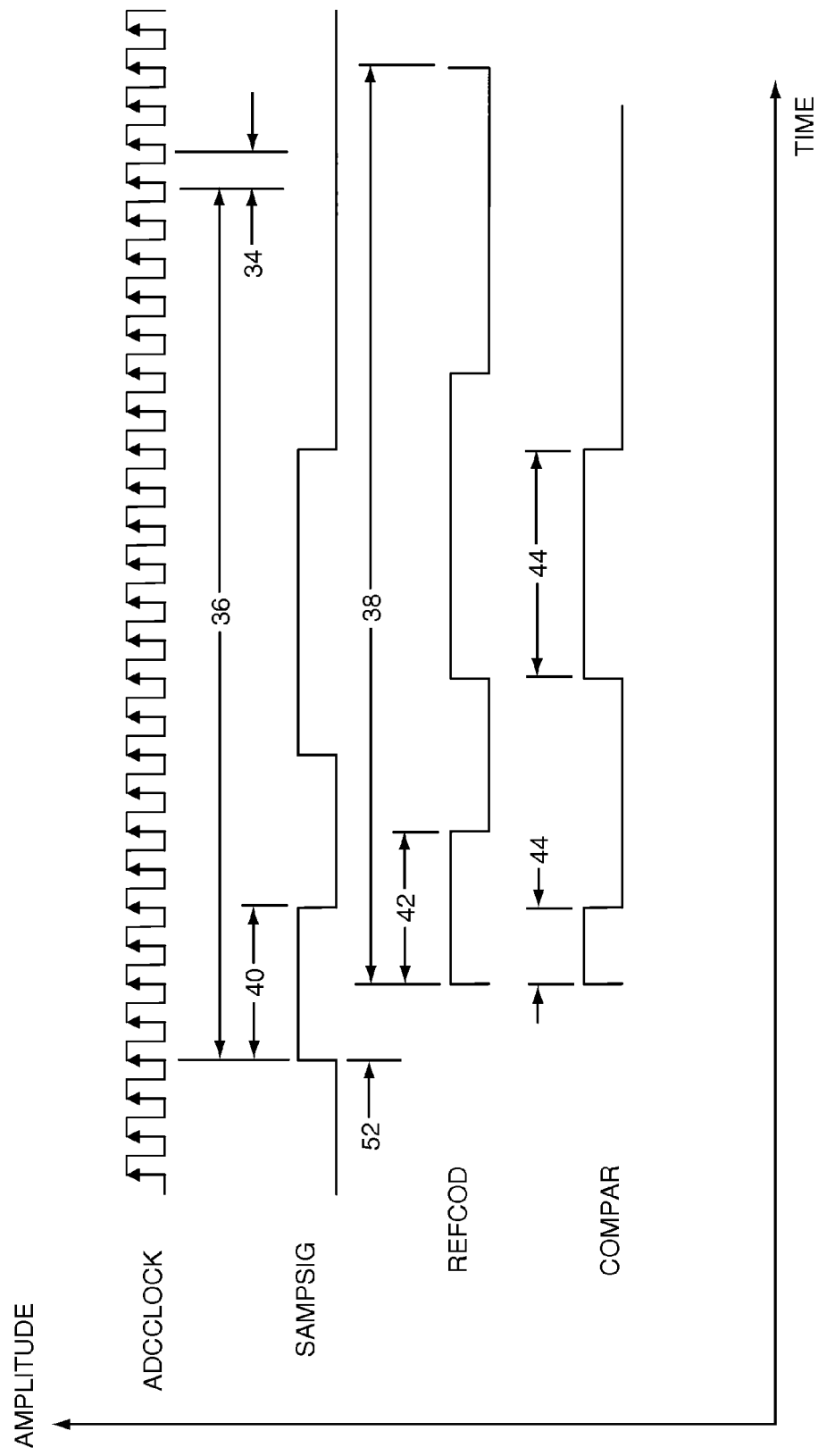
FIG. 7 is a graph illustrating correlation between the sampled signal and the reference code when the reference code lags the sampled signal by two cycles of the sampling clock.

FIG. 7 is a graph illustrating correlation between the sampled signal SAMPSIG and the reference code REFCOD 38 when the reference code REFCOD 38 lags the sampled signal SAMPSIG by two cycles 52 of the sampling clock ADCCLOCK. The high state 44 of the compare result COMPAR is four cycles of the sampling clock ADCCLOCK less than the perfect correlation illustrated in FIG. 3 and is equal to the correlation illustrated in FIG. 5.

Figure 8:
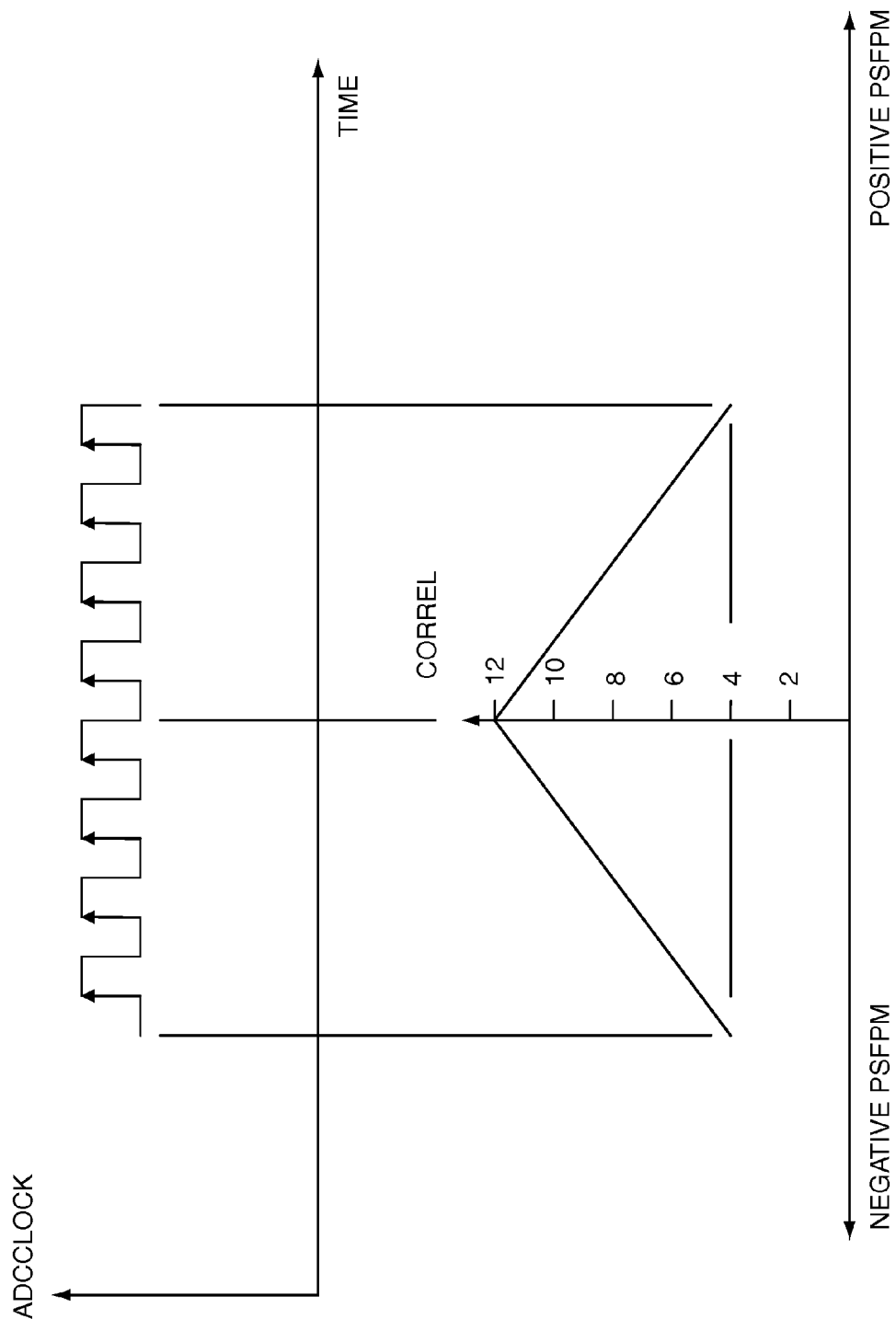
FIG. 8 shows a triangular shaped correlation curve that relates correlation to the phase shift between the reference code and the sampled signal.

FIG. 8 shows a triangular shaped correlation curve that relates correlation to the phase shift between the reference code REFCOD and the sampled signal SAMPSIG. As illustrated in FIGS. 3, 4, 5, 6, and 7, as the reference code REFCOD 38 is subjected to either a positive phase-shift POSITIVE PSFPM or a negative phase-shift NEGATIVE PSFPM from the code 36 embedded in the sampled signal SAMPSIG, the correlation CORREL drops in a linear and symmetrical manner.

Figure 9:
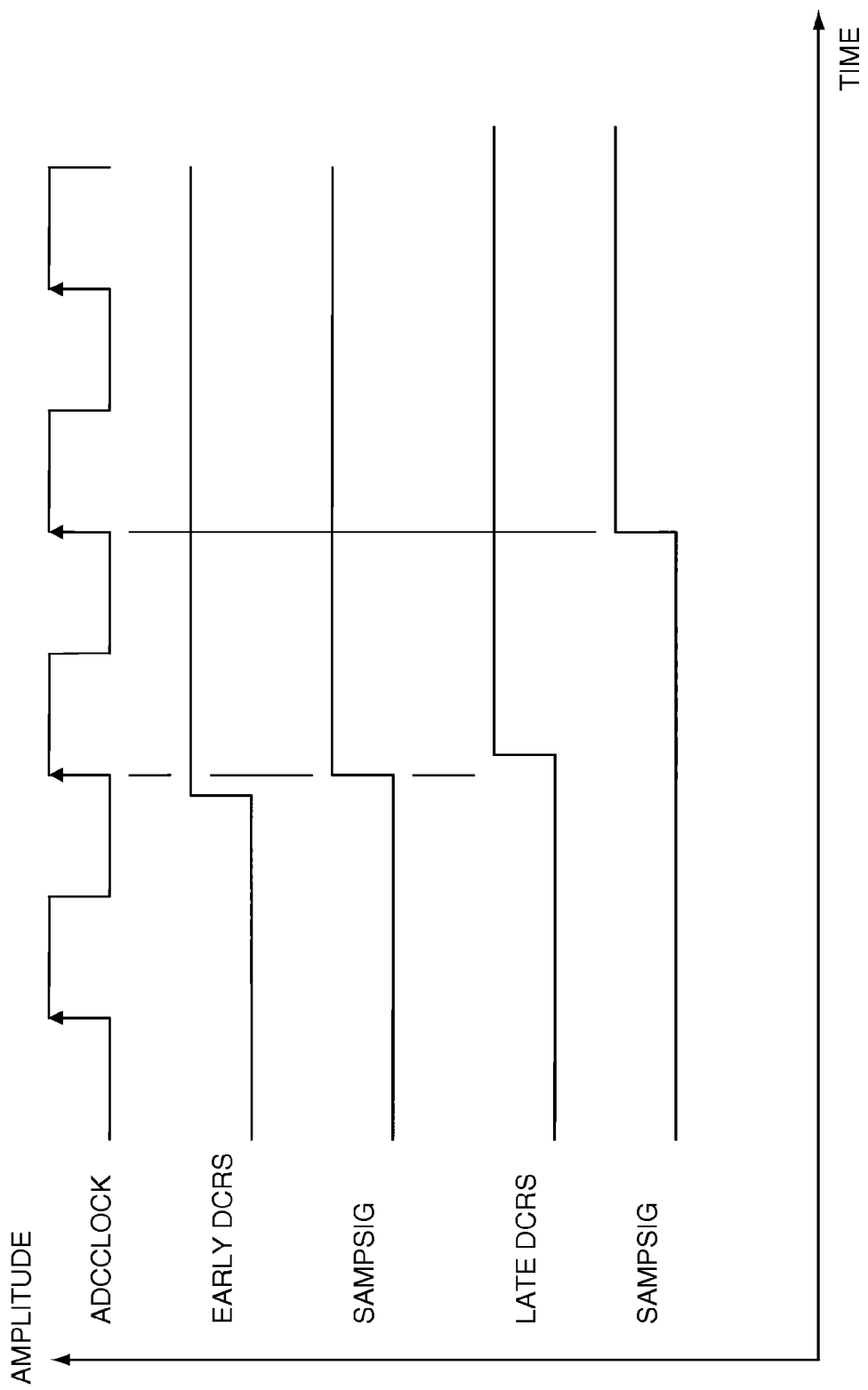
FIG. 9 illustrates the effects of sampling a received signal.

FIG. 9 illustrates the effects of sampling the down converted received signal DCRS, which is asynchronous with the sampling clock ADCCLOCK. If the significant edge of the sampling clock ADCCLOCK is nearly simultaneous with a transition of the down converted received signal DCRS, then the sampled signal SAMPSIG will vary by one cycle of the sampling clock ADCCLOCK depending on whether the down converted received signal DCRS is early with respect to the sampling clock ADCCLOCK, or late with respect to the sampling clock ADCCLOCK. An early down converted received signal EARLYDCRS produces an early sampled signal EARLYSAMPSIG, and a late down converted received signal LATEDCRS produces a late sampled signal LATESAMPSIG, which occurs one cycle later as illustrated in FIG. 9.

Figure 10:
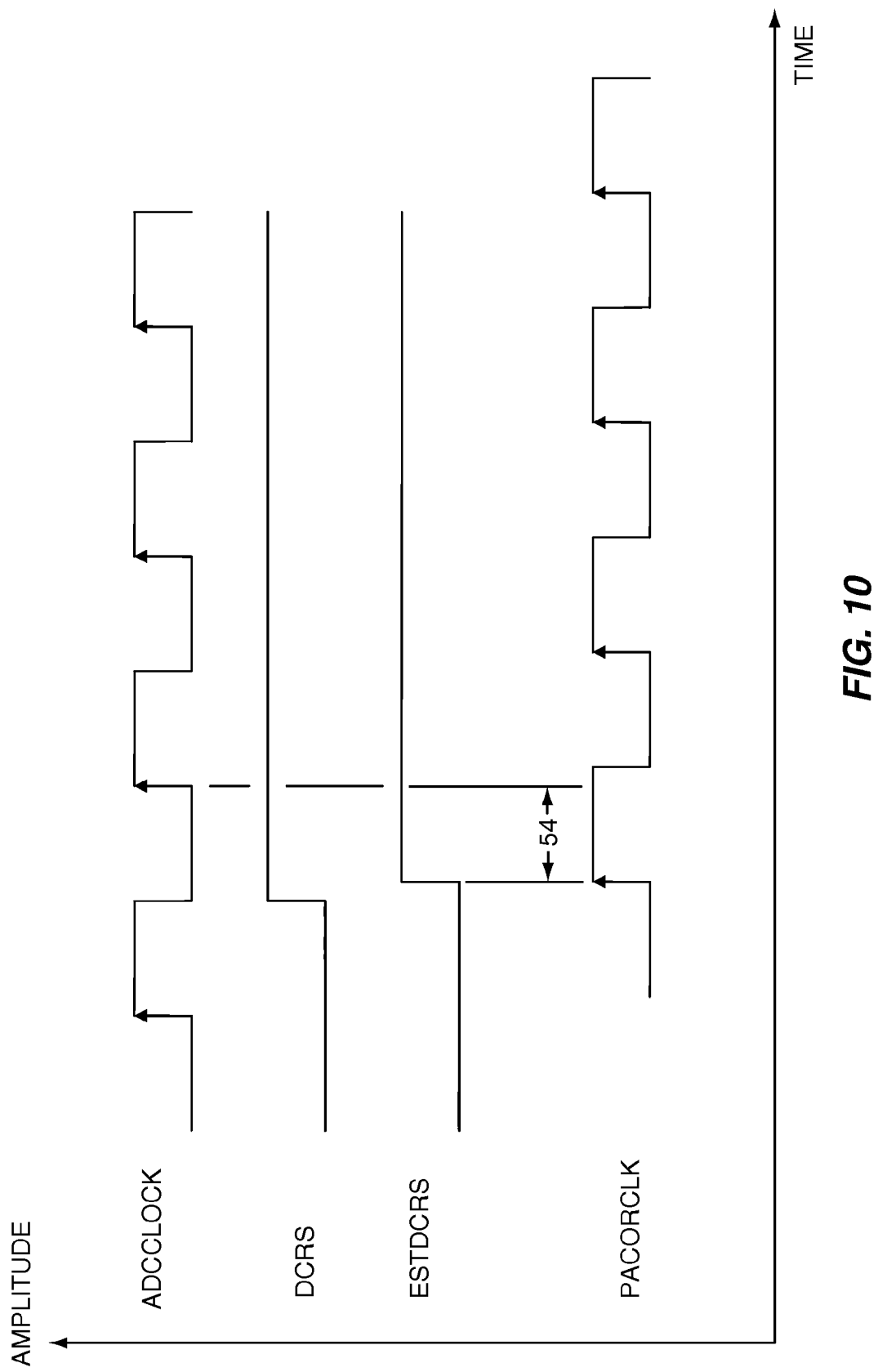
FIG. 10 illustrates an example of the possible relationships between a down converted received signal, an estimate of the down converted received signal, the sampling clock, and a correlation clock that has been phase-shifted from the sampling clock based on a time difference between the estimate of the down converted received signal and an edge of the sampling clock.

FIG. 10 illustrates an example of the possible relationships between the down converted received signal DCRS, an estimate of the down converted received signal ESTDCRS, the sampling clock ADCCLOCK, and the correlation clock that has been phase-shifted PACORCLK from the sampling clock ADCCLOCK based on a time difference 54 between the estimate of the down converted received signal ESTDCRS and an edge of the sampling clock. Over time, the estimate of the down converted received signal ESTDCRS should approach the actual down converted received signal DCRS. In an exemplary embodiment of the present invention, the correlation curve is triangular shaped as illustrated in FIG. 8, and the correlation scaling factor is calculated using the following formula:

$$\text{correlation scaling factor} = 1/(1 - |\text{time difference } 54|)$$

Correlation curves having other than triangular shapes may require using different formulas. Such correlation curves may result from bandwidth limiting in the RF receiver 10; however, the correlation scaling factor with have some kind of an inverse relationship with the time difference 54.

What is claimed is:

1. A method comprising:
    receiving a signal having a first code with a first synchronization point;
    sampling the signal using a sampling clock to create a sampled signal;
    correlating the first code in the sampled signal with a reference code that is associated with a reference code clock to create a correlation, wherein the reference code clock is synchronous with the sampling clock and the reference code clock has a first phase-shift with respect to the sampling clock;
    creating a first scaling factor based on the first phase-shift; and
    generating a first scaled correlation based on the correlation and the first scaling factor,
    wherein the first phase-shift is based on estimating an arrival time of the first synchronization point relative to the sampled signal.

2. The method of claim 1 wherein the first scaling factor is inversely related to the first phase-shift.

3. The method of claim 1 wherein the first phase-shift is approximately zero.

4. The method of claim 1 wherein the first phase-shift is approximately equal to a difference between the estimated arrival time of the first synchronization point and an edge of the sampling clock.

5. The method of claim 4 wherein the edge of the sampling clock is the nearest edge of the sampling clock.

6. The method of claim 4 wherein a first difference is approximately equal to one minus an absolute value of the first phase-shift, and the first scaling factor is equal to the reciprocal of the first difference.

7. The method of claim 1 wherein the first scaling factor is further based on compensating for alterations to the first code as a result of filtering the signal.

8. The method of claim 1 wherein the first synchronization point is coincident with a beginning of the first code.

9. The method of claim 1 wherein the signal further comprises a plurality of codes having a plurality of synchronization points.

10. The method of claim 9 wherein the signal may be interrupted between two of the plurality of codes.

11. The method of claim 9 wherein the first scaled correlation is further based on a plurality of correlations, which are generated by correlating each of the plurality of codes with each of a plurality of reference codes.

12. The method of claim 11 wherein the first scaled correlation is further based on a plurality of scaling factors, which are based on a plurality of phase-shifts between the sampling clock and the reference code clock during the plurality of correlations.

13. The method of claim 11 further comprising a plurality of scaled correlations, which are based on the plurality of correlations and at least one scaling factor.

14. The method of claim 13 wherein estimating an arrival time of a subsequent synchronization point is based on the plurality of scaled correlations.

15. The method of claim 1 wherein estimating an arrival time of a subsequent synchronization point is based on the first scaled correlation.

16. The method of claim 1 wherein estimating an arrival time of a subsequent synchronization point based on a first early scaled correlation and a first late scaled correlation, the method further comprising:
    to generate the first early scaled correlation:
        generating a first early correlation by correlating the first code in the sampled signal with the reference code that is associated with the reference code clock, wherein the reference code clock is synchronous with the sampling clock and the reference code clock has a second phase-shift with respect to the sampling clock;
        creating a first early scaling factor based on the second phase-shift; and
        generating the first early scaled correlation based on the first early correlation and the first early scaling factor; and
    to generate the first late scaled correlation:
        generating a first late correlation by correlating the first code in the sampled signal with the reference code that is associated with the reference code clock, wherein the reference code clock is synchronous with the sampling clock and the reference code clock has a third phase-shift with respect to the sampling clock;
        creating a first late scaling factor based on the third phase-shift; and
        generating the first late scaled correlation based on the first late correlation and the first late scaling factor,
    wherein the reference code used in the first early correlation is shifted
    from the reference code used in the first late correlation by at least one cycle of the sampling clock.

17. The method of claim 16 wherein the third phase-shift is approximately equal to the second phase-shift.

18. The method of claim 16 wherein estimating an arrival time of a subsequent synchronization point is based on approximately three times the first early scaled correlation minus the first late scaled correlation.

19. The method of claim 16 wherein estimating an arrival time of a subsequent synchronization point is based on a first difference minus a second difference such that the first difference is approximately the first early scaled correlation minus the first late scaled correlation, and the second difference is approximately a second early scaled correlation minus a second late scaled correlation, the method further comprising:
    to generate the second early scaled correlation:
        generating a second early correlation by correlating the first code in the sampled signal with the reference code that is associated with the reference code clock, wherein the reference code clock is synchronous with the sampling clock and the reference code clock has a fourth phase-shift with respect to the sampling clock;
        creating a second early scaling factor based on the fourth phase-shift; and
        generating the second early scaled correlation based on the second early correlation and the second early scaling factor; and
    to generate the second late scaled correlation:
        generating a second late correlation by correlating the first code in the sampled signal with the reference code that is associated with the reference code clock, wherein the reference code clock is synchronous with the sampling clock and the reference code clock has a fifth phase-shift with respect to the sampling clock;
        creating a second late scaling factor based on the fifth phase-shift; and
        generating the second late scaled correlation based on the second late correlation and the second late scaling factor,
    wherein the reference code used in the second early correlation is shifted from the reference code used in the second late correlation by at least one cycle of the sampling clock.

20. A receiver comprising:
    digitization circuitry adapted to:
        receive a signal having a first code with a first synchronization point; and
        sample the signal using a sampling clock to create a sampled signal;
    scaled correlation circuitry adapted to:
        create a first correlation by correlating the first code in the sampled signal with a reference code that is associated with a reference code clock, wherein the reference code clock is synchronous with the sampling clock and the reference code clock has a first phase-shift with respect to the sampling clock;
        create a first scaling factor based on the first phase-shift; and
        generate a first scaled correlation based on the first correlation and the first scaling factor,
    wherein the first phase-shift is based on estimating an arrival time of the first synchronization point relative to the sampled signal.

* * * * *